(12) United States Patent
Kasai et al.

(10) Patent No.: US 6,783,353 B2
(45) Date of Patent: Aug. 31, 2004

(54) INJECTION UNIT OF INJECTION MOLDING MACHINE

(75) Inventors: Toshihiro Kasai, Mishima (JP);
Kazuhito Kobayashi, Numazu (JP);
Junsuke Kawai, Numazu (JP);
Fumiyuki Katoh, Shizuoka-ken (JP)

(73) Assignee: Toshiba Machine Co., Ltd., Tokyo (JP)

( * ) Notice: Subject to any disclaimer, the term of this patent is extended or adjusted under 35 U.S.C. 154(b) by 49 days.

(21) Appl. No.: 10/228,187

(22) Filed: Aug. 27, 2002

(65) Prior Publication Data

US 2003/0049351 A1 Mar. 13, 2003

(30) Foreign Application Priority Data

Sep. 12, 2001 (JP) ........................................ 2001-276692

(51) Int. Cl.$^7$ ............................................. B29C 45/17
(52) U.S. Cl. ...................................... 425/574; 425/575
(58) Field of Search ............................... 425/145, 574, 425/575

(56) References Cited

U.S. PATENT DOCUMENTS 4,828,473 A * 5/1989 Otake et al. ................. 425/145
6,309,203 B1 * 10/2001 Tamaki et al. ............... 425/145
6,524,095 B1 * 2/2003 Ito et al. ...................... 425/574

FOREIGN PATENT DOCUMENTS

| DD | 282 656 A5 | 9/1990 |
| DE | 198 52 513 A1 | 6/1999 |
| JP | 2631521 | 4/1997 |
| JP | 10-286848 | 10/1998 |

* cited by examiner

*Primary Examiner*—Tim Heitbrink
(74) *Attorney, Agent, or Firm*—Pillsbury Winthrop LLP

(57) ABSTRACT

A front plate and rear plate are connected to each other through a plurality of the bars. An intermediate plate is arranged between the front plate and the rear plate and guided by the tie bars to be movable. The front plate is fixed to a slide table. The rear plate and intermediate plate are supported by a linear slide guide on the slide table. A rear end portion of a barrel is fixed to a central area of the front plate. A rear end portion of a screw is supported by the intermediate plate with a bearing in between. A ball screw is incorporated in the rear plate and a forward end of a threaded rod of the ball screw is fixed to a central area of a back surface of the intermediate plate through a load cell.

6 Claims, 3 Drawing Sheets

INJECTION UNIT OF INJECTION MOLDING MACHINE

CROSS-REFERENCE TO RELATED APPLICATIONS

This application is based upon and claims the benefit of priority from the prior Japanese Patent Application No. 2001-276692, filed Sep. 12, 2001, the entire contents of which are incorporated herein by reference.

BACKGROUND OF THE INVENTION

1. Field of the Invention

The present invention relates to an injection unit of an injection molding machine and, in particular, an injection unit of a three-plate structure.

2. Description of the Related Art

FIG. 3 shows a general arrangement of a conventional injection unit of a three-plate structure. A front plate 5 and rear plate 6 are arranged on a base 1 and connected through a plurality of tie bars 8 to each other. An intermediate plate 7 is arranged between the front plate 5 and the rear plate 6. The intermediate plate 7 is supported by the tie bars 8 and guided by the tie bars 8 such that it can be moved in a forward/backward direction (right/left direction in FIG. 3).

A barrel 2 has a nozzle 3 at its forward end and is connected through the nozzle 3 to a back surface of dies (not shown). A screw 4 is incorporated inside the barrel 2. By rotating the screw 4 inside the barrel 4 a raw resin is introduced into the barrel 2 and, while being heated and kneaded, fed toward the forward end side of the barrel 2. After a predetermined amount of molten resin has been stored in the forward end side of the barrel 2, the molten resin is injected into the dies by forwardly moving the screw 4 in the barrel 2.

The rear end portion of the barrel 2 is fixed to the central area of the front plate 5 and supported there. The rear end portion of the screw 4 is supported at the central area of the intermediate plate 7 through a bearing 11. A servo motor 12 is set over the intermediate plate 7. The servo motor 12 is used to rotate the screw 4 when the raw resin is introduced into the barrel 2.

A ball screw 13 is incorporated in a central area of the rear plate 6. The forward end of the ball screw 13 is fixed to the central area of the rear surface of the intermediate plate 7 through a load cell 14. A servo motor 15 is set on the rear plate 6. In the injection of a molten resin from the barrel 2 into the dies, the motor 15 is used to drive the ball screw 13 and move the screw 4 forwardly.

The conventional injection unit of a three-plate structure had the following problems.

With an increasing size of the screw 4, the forward thrust force of the screw 4 is increased sometimes to nearly a few hundred tons. In the control of the injection pressure of the molten resin, it is usually necessary to detect the forward thrust force of the screw 4. In the detection of the forward thrust force of the screw 4, the load cell 14 is often used as shown in FIG. 3. However, such load cell which detects a load of a few hundred tons is not normal and, upon the manufacture of it, becomes very large in size. It may be considered that a plurality of relatively small sized load cells are arranged in a parallel array to detect a thrust force involved. In this case, a greater space is required to mount these load cells and the injection unit becomes larger in size.

In order to avoid such problems, a proposal has been made to detect a forward thrust force from the strain of an associated component part without using the load cell. In the detection of the forward thrust force from the strain of the rear plate 6 or the intermediate plate 7, the friction resistance of a slide section between the intermediate plate 7 and the tie bars 8 exerts a greater effect on a measured value of a strain involved. It is, therefore, difficult to obtain an adequate accuracy of detection.

In order to drive the screw 4 (and hence the intermediate plate 7) in the forward/backward direction, a ball screw 13 is generally used. If, however, the rigidity of a mounting section of the ball screw 13 is low, a lateral load is generated, thus causing a rapid lowering in the service life of the ball screw 13. It is, therefore, necessary to impart high rigidity to the rear plate 6 and intermediate plate 7 so as to reduce the deflection of these to a smaller extent. If, however, a forward thrust force is to be detected from such small deflection, then resolution is insufficient, thus resulting in less controllability.

Further, the tie bars 8 are also considered as component parts for which it may be possible to detect the strain relatively easily. Even in this case, the friction resistance of the slide section between the intermediate plate 7 and the tie bars 8 exerts some effect on a measured strain value and it is hard to obtain high detection accuracy. Since the tie bars 8 are elongated due to a reaction force induced against the forward thrust force, the rear plate 6 is somewhat moved backward on the base 1 due to small slide movement. This generates a friction resistance and exerts some effect on an elongation amount of the tie bar. It is, therefore, not possible to detect a variation in a very small thrust force.

When the weight of the intermediate plate 7 is increased, then the bending moment acting on the tie bars 8 is increased and, as shown in FIG. 3, a deflection induced in the tie bar 8 cannot be disregarded. Since, in such a case, the distribution of the bending moment varies depending upon the position of the intermediate plate 7, its effect appears on the strain of the tie bar 8, thus lowering the detection accuracy of the forward thrust force.

Further, when the deflection of the tie bar 8 is increased by the weight of the intermediate plate 7, the intermediate plate 7 is tilted and the connected section of a threaded rod of the ball screw 13 is off-centered. Since this off-centered state acts as a lateral load on the ball screw 13, there arises a lowering in the service life of the ball screw 13. In order to decrease the deflection of the tie bar 8, the method for increasing the diameter of the tie bar 8 is considered. However, the elongation due to the forward thrust force is lowered, so that the resolution is inadequate. Further, increasing the diameter of the tie bar 8 is not desirable because this provides a factor for increasing the size of a resultant machine.

Another method may be considered by which, in order to reduce the deflection of the tie bar 8, the length of the tie bar 8 is shortened, that is, the distance between the front plate 5 and the rear plate 6 is made shorter. This method is restricted because the length of the tie bar 8 is restricted by the axial stroke of the screw 4 as well as the mounting space of the ball screw 13.

BRIEF SUMMARY OF THE INVENTION

The present invention is achieved with the above-mentioned problems of the injection unit of the conventional injection molding machine in view and it is the object of the present invention to provide an injection unit of a injection molding machine which can enhance the detection accuracy of a forward thrust force of a screw and obtain a small-sized unit;

According to the present invention there is provided an injection unit of an injection molding machine comprising: a barrel having a nozzle at a forward end and connected to a back surface of a dies through the nozzle; a screw incorporated into the barrel and configured to inject a molten resin into the dies by being forwardly moved in the barrel; a front plate configured to support a rear end portion of the barrel; a rear plate arranged at a backward side of the front plate and connected through tie bars to the front plate; an intermediate plate arranged between the front plate and the rear plate, having through holes through which corresponding tie bars extend, guided by the tie bar to be moved in a forward/backward direction and configured to support the rear end portion of the screw through a bearing; a motor mounted to the intermediate plate and configured to rotationally drive the screw in the barrel; a linear drive device mounted to the rear plate and configured to drive the intermediate plate in the forward/backward direction in the barrel; a fixed base; and a slide table set on the fixed base and configured to support the front plate, rear plate and intermediate plate and movable in the forward/backward direction, wherein the intermediate plate is supported by a liner slide guide on the table to be movable in the forward/backward direction over the slide table.

According to the injection unit of the injection molding machine, the intermediate plate is supported by the linear slide guide on the slide table and it is not necessary to support the weight of the intermediate plate by the tie bars as in the conventional machine. That is, it is only necessary to impart the guide function to the tie bars in the case of moving the intermediate plate in the forward/backward direction (the axial direction of the screw). In this case, a friction force between the intermediate plate and the linear slide guide becomes far smaller than a friction force between the intermediate plate and the tie bars when the weight of the intermediate plate is supported by the tie bars. If, therefore, a load cell is mounted between the back surface of the intermediate plate and the linear drive device and a forward thrust force (injection pressure) of the screw is detected from the output of the load cell, it is possible to obtain a high measurement accuracy.

Further, the deflection of the tie bar is eliminated and a factor which exerts an off-centered effect on the linear drive device is thus eliminated. It is, therefore, possible to prevent a lowering in the service life of the linear drive device resulting from a lateral load involved.

Further, it is preferable that the rear plate be also supported by the linear slide guide on the slide table to allow it to be moved in the forward/backward direction over the slide table.

Since, by doing so, a friction force between the rear plate and the slide table becomes smaller, almost all reaction force induced against the forward thrust force of the screw can be transmitted to the tie bars. As a result, when the forward thrust force (injection pressure) of the screw is detected from an elastic strain of the tie bar, it is possible to enhance its measuring accuracy.

It is to be noted that the linear drive device is comprised of, for example, a ball screw.

Further, in the above-mentioned injection unit, it is possible to omit the slide table. In this case, it is necessary to support not only the intermediate plate and rear plate but also the front plate by the linear slide guide on the fixed base so as to allow these to be moved in the forward/backward direction over the fixed base. If this is so done, a structure of the injection unit can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
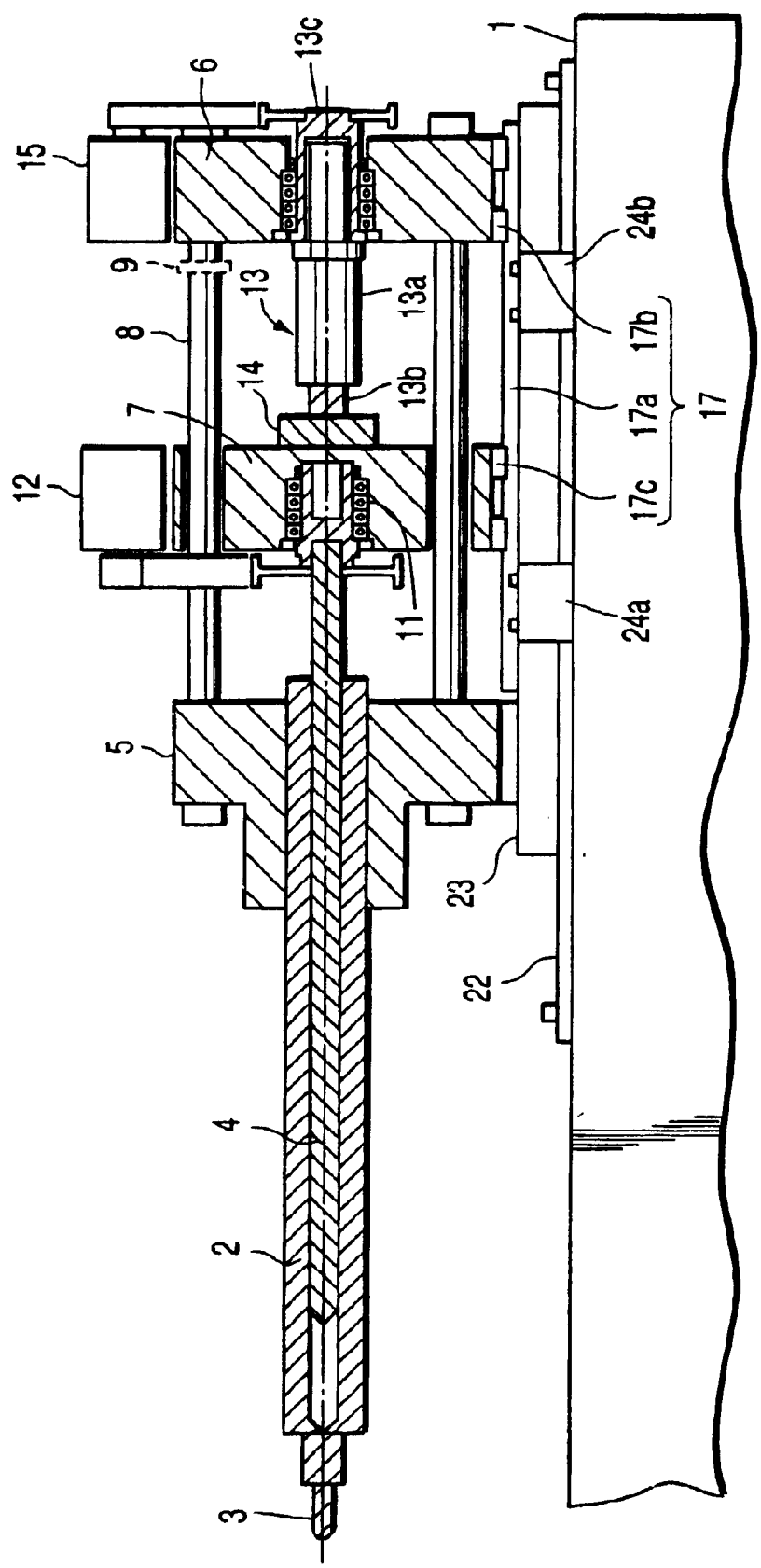
FIG. 1 is a view showing an injection unit of an injection molding machine according to a first embodiment of the present invention.

FIG. 1 shows an injection unit of an injection molding machine according to a first embodiment of the present invention. In FIG. 1, reference numeral 1 shows a base (fixed base); 2, a barrel; 3, a nozzle; 4, a screw; 5, a front plate; 6, a rear plate; 7, an intermediate plate; 8, tie bars; 12, a servo motor; 13, a ball screw (linear drive device); 17, a linear slide guide; and 23, a slide table.

A bed slide 22 is fixed on the base 1 and a slide table 23 is set on the bed slide 22. Guides 24a, 24b are arranged along both side surfaces of the bed slide 22 and fixed on the base 1. The slide table 23 is slidably movable in a forward/backward direction (right/left direction in FIG. 1) on the slide 22 with its lateral (vertical direction to a paper surface) movement restricted by the guides 24a, 24b.

The front plate 5 and rear plate 6 are arranged on the slide table 23 and coupled to each other through a plurality of (2 to 4) tie bars 8. The intermediate plate 7 is arranged between the front plate 5 and the rear plate 6. The intermediate plate 7 has through holes at its peripheral edge portion through which corresponding tie bars extend. The intermediate plate 7 can be moved in a forward/backward direction (right/left direction in FIG. 1) while being guided by the tie bars 8.

In this embodiment, the front plate 5 is fixed on the slide table 23. The rear plate 6 and intermediate plate 7 are supported by the liner slide guides 17 on the slide table 23. The liner slide guide 17 comprises a rail 17a and sliders 17b, 17c, the rail 17a being fixed on the slide table 23, the slider 17b being mounted on the lower end of the rear plate 6, and the slider 17c being mounted on the lower end of the intermediate plate 7.

The barrel 2 has a nozzle 3 at its forward end and is connected to a back surface of dies (not shown) through the nozzle 3. The screw 4 is incorporated in the barrel 2. By rotating the screw 4 in the barrel 2, the raw resin is introduced into the barrel 2 and fed toward the forward end side of the barrel 2 while being heated and kneaded. After a predetermined amount of molten resin is accumulated at the forward end side of the barrel 2, the screw 4 is forwardly moved in the barrel 2 to allow the molten resin to be injected into the dies.

The rear end portion of the barrel 2 is fixed to, and supported by, the central area of the front plate 5. The rear end portion of the screw 4 is supported at a central area of the intermediate plate 7 through a bearing 11. The servo motor 12 is set on the intermediate plate 7 and connected to the screw 4 through a belt and pulley combination. In the introduction of the raw resin into the barrel 2, the servo motor 12 is used to rotate the screw 4.

A housing 13a of the ball screw 13 is fixed to the rear plate 6. The forward end of a threaded rod 13b of the ball screw 13 is fixed to the back surface of the intermediate plate 7 through a load cell 14. A servo motor 15 is set on the rear plate 6. The servo motor 15 is connected to a nut 13C of the ball screw 13 through a belt and pulley combination. In the injection of the molten resin from the barrel 2 into the dies, the servo motor 15 is used to forwardly move the screw 4 through the intermediate plate 7.

In the connection of the nozzle 3 to the back surface of the dies (not shown) or the separation of the nozzle 3 away of the back surface of the dies, the slide table 23 is moved in the forward or backward direction on the bed slide 22 by the use of an actuator (not shown) and, by doing so, it is possible to control the position of the barrel 2 in the forward/backward direction.

Figure 3:
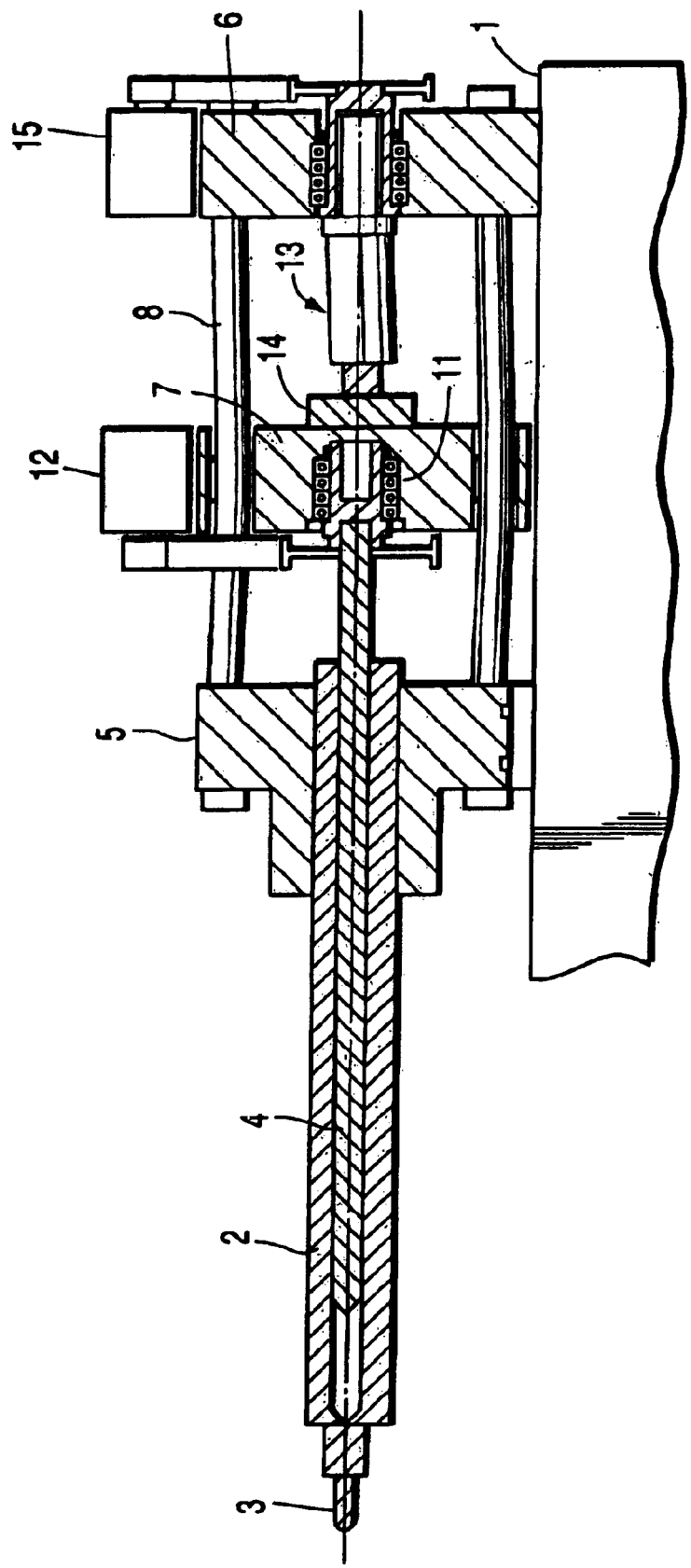
FIG. 3 is a view showing one form of an injection unit of a conventional injection molding machine.

As in the above-mentioned embodiment, the intermediate plate 7 is supported by the linear slide guide 17 on the table 23 and it is, therefore, not necessary to support the weight of the intermediate plate 7 by the tie bars 8. It is only necessary that the tie bars 8 have the function of transmitting a reaction force which is induced against a forward thrust force of the screw 4 from the rear plate 6 to the front plate 5. In this case, a friction force between the intermediate plate 7 and the linear slide guide 17 becomes very small compared to a friction force between the intermediate plate 7 and the tie bar 8 which is produced when the weight of the intermediate plate 7 has to be supported by the tie bars 8 as in the conventional case (FIG. 3). It is, therefore, possible to obtain a high measurement of accuracy when a forward thrust force (injection pressure) is detected from the output of the load cell 14.

Further, the deflection of the tie bar 8 is eliminated and a factor which produces an off-centered effect on the ball screw 17 is eliminated. It is possible to prevent a lowering in the service life of the ball screw 17 resulting from a lateral load involved.

Since the friction force between the rear plate 6 and the slide table 23 becomes smaller by supporting the linear plate 6 by the linear slide guide 17 on the slide table 23, almost all reaction force induced against the forward thrust force of the screw 4 can be transmitted to the tie bars 8. If, therefore, a strain detector 9 is mounted on the tie bar 8 to detect a forward thrust force (injection pressure) of the screw 4 from an elastic strain of the tie bar 8, then it is possible to obtain a high measurement accuracy.

(Second Embodiment)

Figure 2:
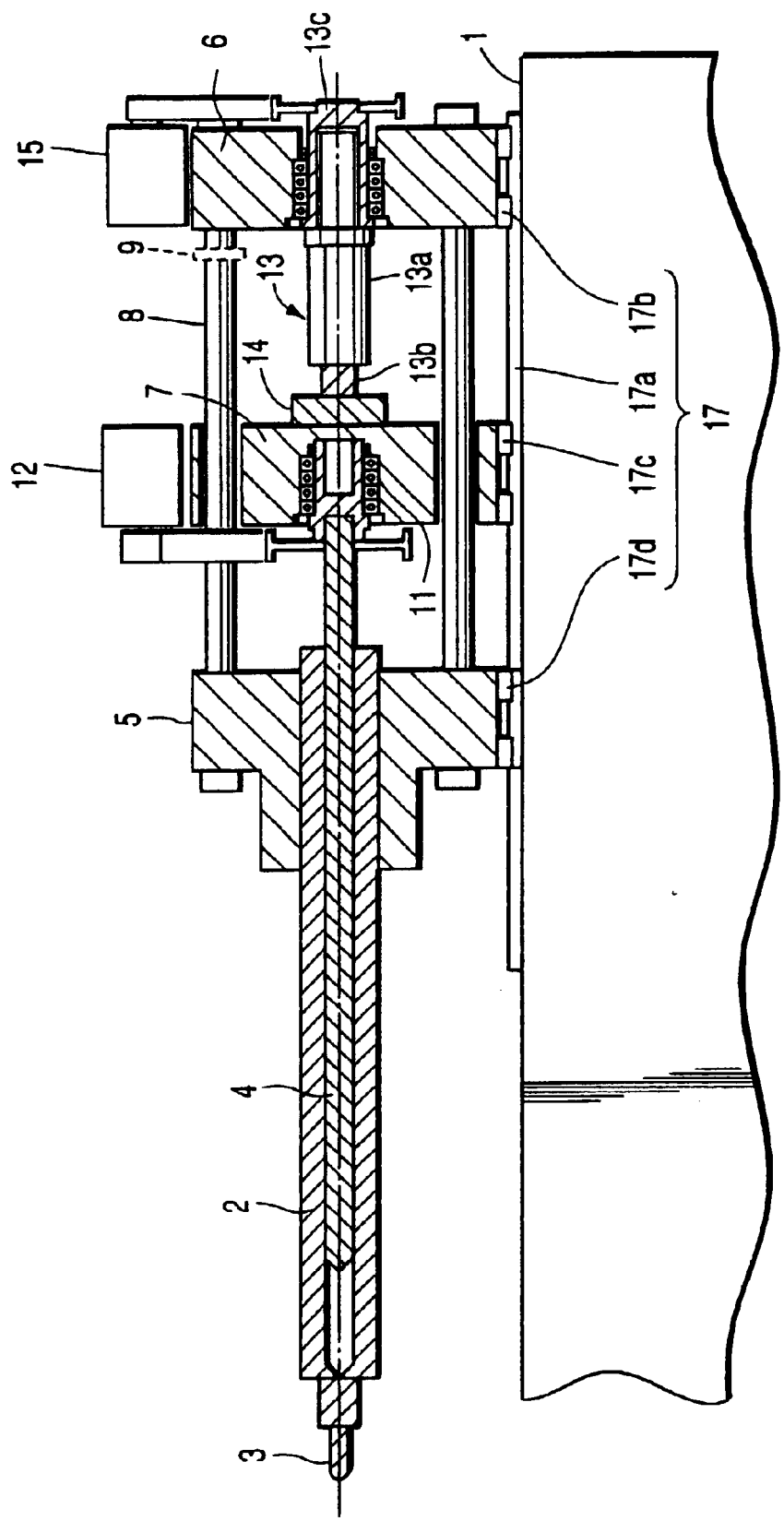
FIG. 2 is a view showing an injection unit of an injection molding machine according to a second embodiment of the present invention.

FIG. 2 shows an injection unit of an injection molding machine according to a second embodiment of the present invention. In this second embodiment, the slide table 23, bed slide 22 and guides 24a, 24b of the first embodiment are omitted and a linear slide guide 17 is fixed directly on a base 1. Instead, not only an intermediate plate 7 and rear plate 6 but also a front plate 5 is supported by the linear slide guide 17 on the base 1. This linear slide guide 17 comprises a rail 17a and sliders 17b, 17c and 17d, the rail 17a being fixed on the base 1, the slider 17b being mounted on the lower end of the rear plate 6, the slider 17c being mounted on the lower end of the intermediate plate 7, and the slider 17d being mounted on the lower end of the front plate 5.

In the case where, in this structure, a nozzle 3 is connected to the back surface of dies (not shown) or separated away from the dies, an actuator (not shown) is used to move the front plate 5 (or the rear plate 6) in a forward or backward direction on the linear slide guide 17 and, by doing so, control the position of a barrel 2 in the forward or backward direction.

By thus omitting the slide table 23 it is possible to obtain an injection unit of a simpler structure.

Although, in the second embodiment above, the rail 17a of the linear slide guide 17 is so used as to be shared among the respective sliders 17b, 17c and 17d, an individual rail may be provided for each slider (17b, 17c and 17d).

According to the injection unit of the injection molding machine, a friction force between the intermediate plate and the linear slide guide is far smaller than a friction force between the intermediate plate and the tie bars when the weight of the intermediate plate is supported by the tie bars. In the case where a load cell is mounted between the back surface of the intermediate plate and a linear drive device and a forward thrust force (injection pressure) of a screw is detected from an output of the load cell, it is possible to obtain a high measurement of accuracy.

By supporting the rear plate by the linear slide guide on the slide table, a friction force between the rear plate and the slide table is made smaller and almost all reaction force induced against a forward thrust force of the screw can be transmitted to the tie bars. When, therefore, the forward thrust force (injection pressure) of the screw is detected from an elastic strain of the tie bar, it is possible to obtain high measurement accuracy.

In the injection unit of the injection molding machine according to the present invention, if the slide table, etc., is omitted and, instead, not only the intermediate plate and rear plate but also the front plate is supported by the linear slide guide on the fixed base, it is possible to simplify the structure of the injection unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection unit of an injection molding machine, comprising:

a barrel having a nozzle at a forward end and connected to a back surface of a mold through the nozzle;

a screw incorporated in the barrel and configured to inject a molten resin into the mold by being forwardly moved in the barrel;

a front plate configured to support a rear end portion of the barrel;

a rear plate arranged on a backward side of the front plate and connected through tie bars to the front plate;

an intermediate plate arranged between the front plate and the rear plate, said intermediate plate having through holes through which corresponding tie bars extend and guided by the tie bars to be moved in a forward/backward direction and configured to support the rear end portion of the screw through a bearing;

a motor mounted to the intermediate plate and configured to rotationally drive the screw in the barrel;

a linear drive device mounted to the rear plate and configured to drive the intermediate plate in the forward/backward direction;

a fixed base; and a slide table set on the fixed base and configured to support the front plate, rear plate and intermediate plate and movable in the forward/backward direction, wherein said intermediate plate is supported by a linear slide guide on said slide table to be movable in the forward/backward direction over said slide table.

2. An injection unit of an injection molding machine according to claim 1, in which said linear drive device is comprised of a ball screw.

3. An injection unit of an injection molding machine according to claim 1, in which said rear plate is supported by a linear slide guide on said slide table to be movable in the forward/backward direction over said slide table.

4. An injection unit of an injection molding machine according to claim 3, in which said linear drive device is comprised of a ball screw.

5. An injection unit of an injection molding machine, comprising:

a barrel having a nozzle at a forward end and connected to a back surface of a mold through a nozzle;

a screw incorporated in the barrel and configured to inject a molten resin into the mold by being forwardly moved in the barrel;

a front plate configured to support a rear end portion of the barrel; a rear plate arranged on a backward side of the front plate and connected through tie bars to the front plate;

an intermediate plate arranged between the front plate and the rear plate, said intermediate plate having through holes through which corresponding the bars extend and guided by the tie bars to be moved in the forward/backward direction, and configured to support the rear end portion of the screw through a bearing;

a motor mounted to the intermediate plate and configured to rotationally drive the screw in the barrel;

a linear drive device mounted to the rear plate and configured to drive the intermediate plate in the forward/backward direction;

a fixed base; and a linear slide guide set on the fixed base and configured to support the front plate, rear plate and intermediate plate to be movable in the forward/backward direction.

6. An injection unit of an injection molding machine according to claim 5, in which said linear drive device is comprised of a ball screw.

* * * * *